United States Patent [19]

Scarbrough et al.

[11] Patent Number: 5,130,695
[45] Date of Patent: Jul. 14, 1992

[54] ALARM SYSTEM WITH SUSTAINED ALARM

[76] Inventors: James E. Scarbrough, Rte. 2, Box 196-B; Kenneth W. Scarbrough, Rte. 1, Box 53-A, both of Buchanan, Tenn. 38222

[21] Appl. No.: 611,166

[22] Filed: Nov. 8, 1990

Related U.S. Application Data

[63] Continuation-in-part of Ser. No. 338,052, Apr. 14, 1989, abandoned.

[51] Int. Cl.⁵ .................. G08B 23/00; G08B 13/08
[52] U.S. Cl. .................. 340/527; 340/309.15; 340/547; 340/568; 340/984
[58] Field of Search .......... 340/527, 529, 530, 309.15, 340/547, 568, 566, 984, 429, 426; 361/196, 195

[56] References Cited

U.S. PATENT DOCUMENTS

| | | | |
|---|---|---|---|
| 3,761,912 | 9/1973 | Stettner et al. | 340/527 |
| 3,959,789 | 5/1976 | McGahee | 340/568 |
| 3,965,465 | 6/1976 | Alexander | 340/527 |
| 4,006,451 | 2/1977 | Nobile | 340/426 |
| 4,125,826 | 11/1978 | Rasmusset et al. | 340/426 |
| 4,222,032 | 9/1980 | Speer | 340/426 |

*Primary Examiner*—Glen R. Swann, III
*Attorney, Agent, or Firm*—Walker & McKenzie

[57] ABSTRACT

An alarm system includes an electrical energy source; an alarm for producing an alarm signal when electrically coupled to the electrical energy source; a switch for movement from a first position to a second position upon the occurrence of the monitored event; and timing circuitry for being activated when the switch is moved from the first position to the second position, for electrically coupling the alarm to the electrical energy source, for continuing to electrically couple the alarm to the source of electrical energy for a set period of time even if the switch is subsequently moved back to the first position during the set period of time, for deactivating the alarm a certain period of time after the alarm is activated, and for reactivating the alarm a certain period of time after the alarm is deactivated if the switch remains in the second position.

10 Claims, 3 Drawing Sheets

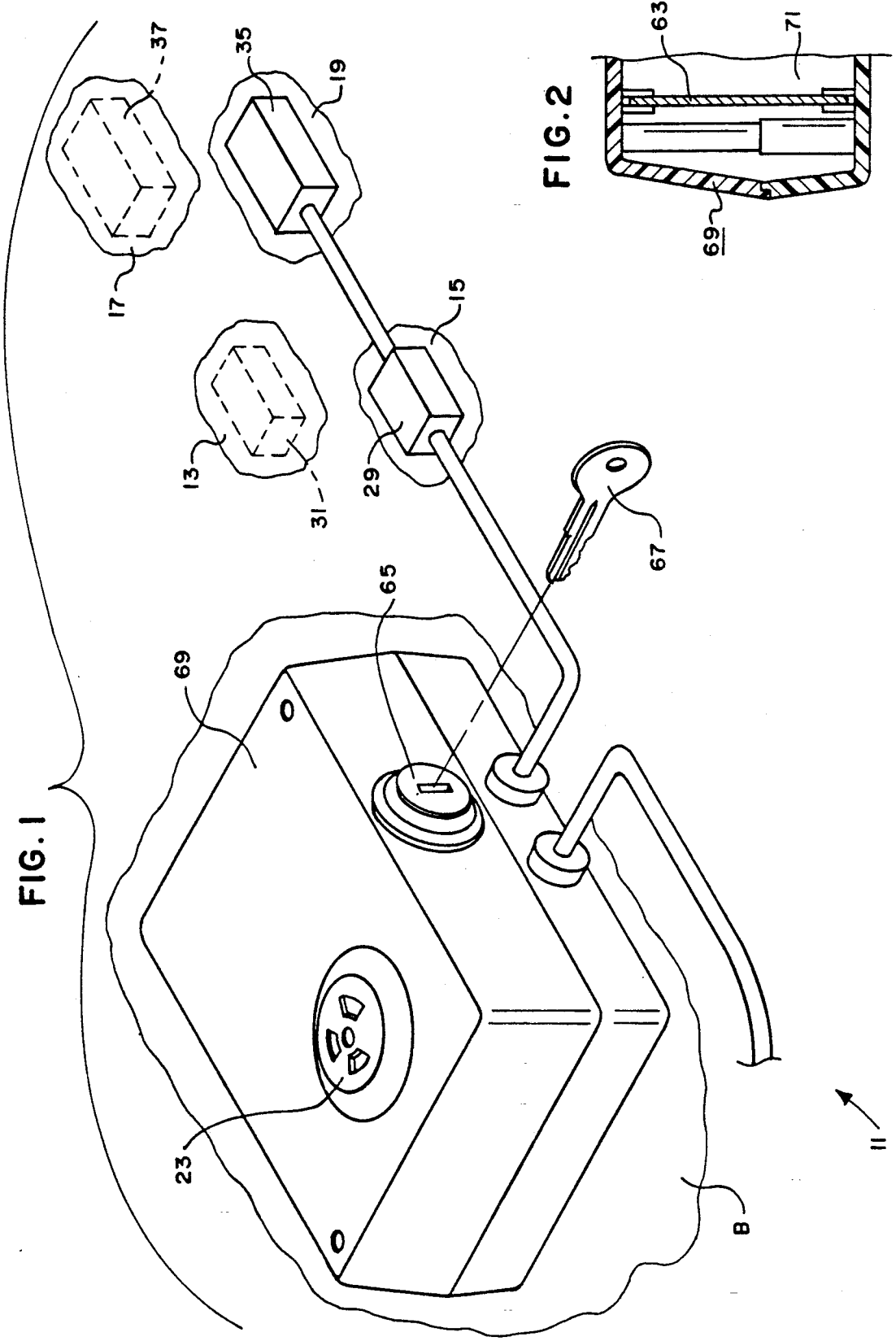

ALARM SYSTEM WITH SUSTAINED ALARM

CROSS-REFERENCE TO RELATED APPLICATION

This is a continuation-in-part of our pending application, Ser. No. 07/338,052, filed Apr. 14, 1989, entitled "ALARM SYSTEM", now abandoned.

BACKGROUND OF THE INVENTION

1. Field of the Invention

The present invention relates, in general, to alarm systems for boats, vending machines, and the like for producing a sustained alarm upon the occurrence of a monitored event such as the unauthorized tampering with of a monitored boat, vending machine, or the like.

2. Background of the Invention

Various alarm systems have been developed for buildings, homes, automobiles, and the like. Most prior art alarm systems, once set off by an unauthorized opening of a door, window, or the like, will typically sound and/or flash an alarm signal until the system is reset by an authorized person even if the door, window or the like is closed. While such operations are desirable with respect to houses and buildings having a continuous source of electrical energy (i.e., the typical 120 volt electrical current supplied to the building or house by a public utility or the like), problems occur when the system is dependent upon a finite source of electrical energy such as a 12 volt direct current automobile battery, in which case the alarm may completely drain the battery before an authorized person can reset the system. This is especially true where the system is used to protect items which may be located remote from authorized persons such as boats moored a distance away from houses, vending machines, etc., or which may be located in fairly loud ambient conditions such as a boat being pulled on a trailer behind an automobile or the like wherein the alarm may be accidentally set off by the movement of the boat and the battery may be completely drained by the time the accident is noticed.

McGahee, U.S. Pat. No. 3,959,789, discloses a check or credit card monitor consisting of a plurality of normally closed switches adapted to be held open by insertion of credit cards or similar items between the switch contacts. The contacts are connected parallel to a timing means adapted to energize a sensory alarm such as an audio signal, vibrator or light a predetermined time after closure of any one of the plurality of switches.

Alexander, U.S. Pat. No. 3,965,465, discloses a switch adapted to fit into a conventional switch box to activate an entryway light of a building for a predetermined period of time after a person has merely touched a door knob or the like. The switch is connected to a conductive latch in a door controlling access to the entryway to receive the minute electrical charge carried by a person attempting to operate the latch through a door knob or the like. Upon being triggered by such a charge, the switch will turn on the light for a predetermined time to provide a convenience for those authorized to enter, and a deterrent for those who are not.

Nobile, U.S. Pat. No. 4,006,451, discloses an alarm circuit module for automobile, home, or industry. The alarm circuit module includes a thermostatic relay, one or more sensor switches attached to doors, windows, etc., a battery or other source of electrical power, and an alarm (i.e., the existing horn of an automobile) for producing an alarm signal when electrically coupled to the battery. When one of the sensor switches is closed by an unauthorized entry through a door or window, etc., an electric circuit will be completed between the battery and the thermostatic relay. After a period of time, the thermostatic relay will heat sufficiently to close an electric circuit between the battery and the alarm to produce an alarm signal continuously for as long as the sensor switch is closed (i.e., as long as the sensor switch is closed, electric current will pass from the battery to the thermostatic relay and keep the thermostatic relay in a heated, closed state), and will cause the alarm to continue producing the alarm signal for a period of time after the sensor switch is reopened.

Rasmussen et al., U.S. Pat. No. 4,125,826, discloses an alarm system utilizing a vehicle transmitter of pulsed ultrasonic energy directed to a stationary receiver outside the vehicle and which renders an alarm if the receiver does not receive ultrasonic energy of a given frequency for a preset time period. The vehicle transmitter is disabled in response to an intruder alarm in the vehicle detecting the presence of an intruder. The receiver alarm is thus activated either by the presence of an intruder or by the vehicle being moved more than a certain distance from the receiver.

Speer, U.S. Pat. No. 4,222,032, discloses a vehicle cover alarm that includes one or more permanent magnets for being attached to an automobile cover or the like, one or more normally open reed switches for being attached to the automobile in locations for being closed or opened by the magnets when the cover is properly placed over the automobile, and an alarm circuit connected to the switches to activate a warning device such as the automobile's horn or a disabling device such as means for cutting off the power to the automobile's fuel pump if the cover is removed from the automobile.

None of the known prior art alarm systems disclose or suggest the present invention. More specifically, none of the known prior art alarm systems disclose or suggest an alarm system including an electrical energy source; alarm means for producing an alarm signal when electrically coupled to the electrical energy source; switch means for movement from a first position to a second position upon the occurrence of a monitored event; and timing means for being activated when the switch means is moved from the first position to the second position and for electrically coupling the alarm means to the electrical energy source the timing means including means for continuing to electrically couple the alarm means to the source of electrical energy for a set period of time even if the switch means is subsequently moved back to the first position during the set period of time; the timing means including means for deactivating the alarm means a certain period of time after the alarm means is activated and for reactivating the alarm means a certain period of time after the alarm means is deactivated if the switch means remains in the second position.

SUMMARY OF THE INVENTION

The present invention is directed toward providing an improved alarm system for boats, vending machines, and the like that does not draw the source of electrical energy down substantially, that sounds an alarm when one or more switches are moved from a first position to a second position, that continues sounding an alarm for a set period of time even if the switches are moved back to the first position after being moved to the second position, and that stops sounding the alarm after a set period of time if the switches are moved back to the first position after being moved to the second position.

The alarm system of the present invention includes, in general, an electrical energy source; alarm means for producing an alarm signal when electrically coupled to the electrical energy source; switch means for movement from a first position to a second position upon the occurrence of a monitored event; and timing means for being activated when the switch means is moved from the first position to the second position and for electrically coupling the alarm means to the electrical energy source; the timing means including means for continuing to electrically couple the alarm means to the source of electrical energy for a set period of time even if the switch means is subsequently moved back to the first position during the set period of time; the timing means including means for deactivating the alarm means a certain period of time after the alarm means is activated and for reactivating the alarm means a certain period of time after the alarm means is deactivated if the switch means remains in the second position.

BRIEF DESCRIPTION OF THE DRAWINGS

FIG. 1 is a perspective view of a first embodiment of the alarm system of the present invention shown mounted on a boat.

FIG. 2 is a sectional view of a portion of the alarm system of FIG. 1.

DESCRIPTION OF THE PREFERRED EMBODIMENTS

Figure 3:
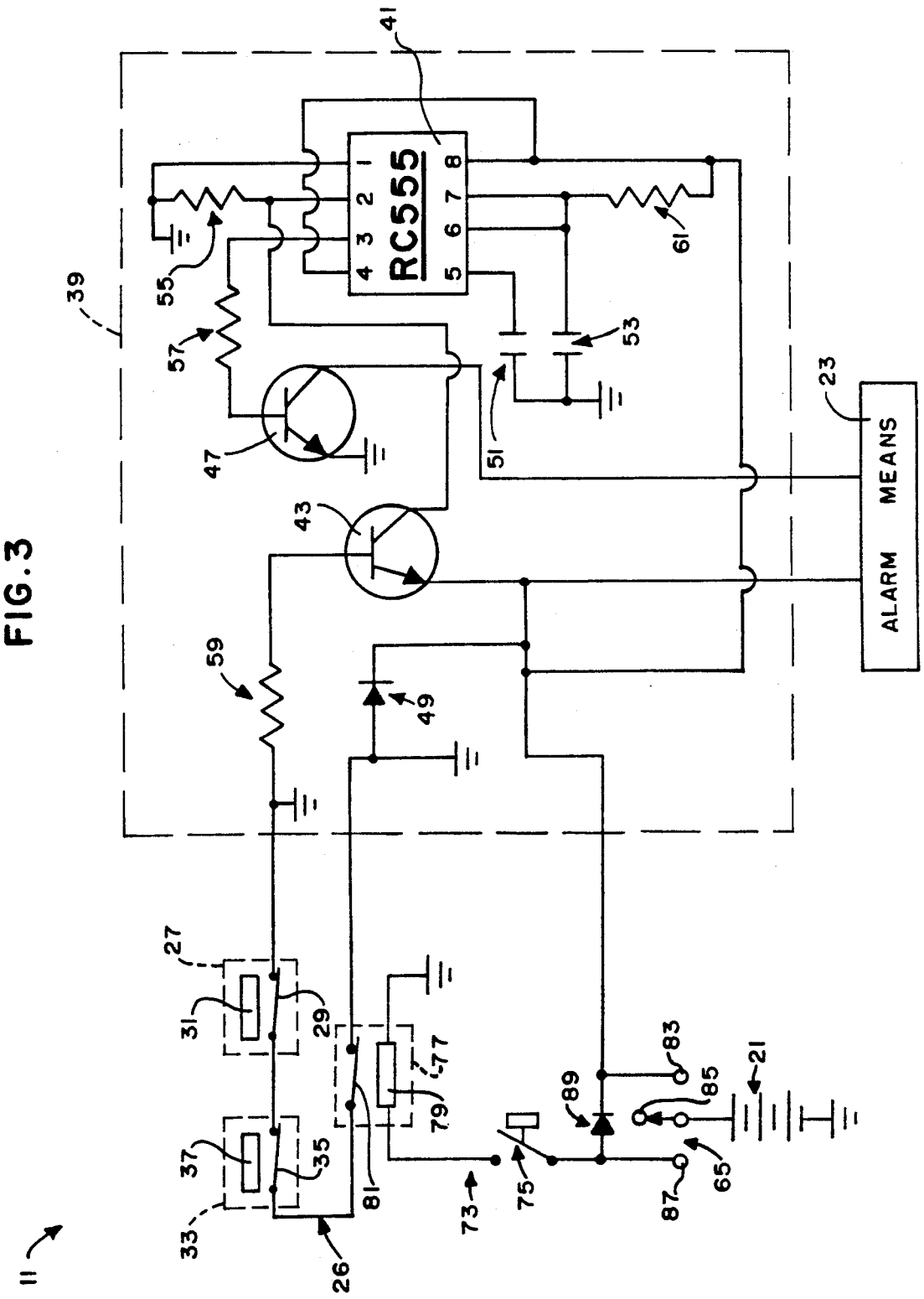
FIG. 3 is a schematic of the electrical components of the alarm system of FIG. 1.

A first preferred embodiment of the alarm system of the present invention is shown in FIGS. 1, 2 and 3 and is identified by the numeral 11. The alarm system 11 is specifically designed for use on a non-chassis ground boat B or the like to produce an alarm signal upon the occurrence of a monitored event such as when an unauthorized person tampers with the boat B. Thus, the alarm system 11 may produce an alarm signal when the distance between a first component 13 of or on the boat B and a second component 15 of or on the boat B is increased by, for example, the first component 13 being moved away from the second component 15. The first component 13 may consist of a lid to a storage compartment on the boat B and the second component 15 may consist of a frame or adjacent structure of the storage compartment and the alarm system 11 can be used to produce an alarm signal if the lid (i.e., the first component 13) is opened. On the other hand, the second component 15 may consist of the boat B itself and the first component 13 may consist of support means to which the boat B is normally secured and the alarm system 11 can be used to produce an alarm signal if the boat B (i.e., the second component 15) is moved away from the support means (i.e., the first component 13). Further, the alarm system 11 may be used with a plurality of coacting components to produce an alarm signal whenever any one component is moved away from the coacting component. Thus, as shown in FIG. 1, the alarm system 11 may produce an alarm signal when the first component 13 is moved away from the second component 15, or when a third component 17 is moved away from a fourth component 19 where the third component 17 may consist of a lid to a second storage compartment on the boat B and the fourth component 19 may consist of a frame or adjacent structure of the second storage compartment, etc. As will hereinafter become apparent, the alarm system 11 may be configured for any number of coacting components including fishing rod lockers, fishing tackle boxes, trolling motors, and other removable accessories, etc., as will now be apparent to those skilled in the art.

As seen in FIG. 3, the alarm system 11 includes an electrical energy source 21. The electrical energy source 21 preferably consists of the typical battery used to energize the various electrical components of the boat B as will now be apparent to those skilled in the art.

The alarm system 11 includes an alarm means 23 for producing an alarm signal when electrically energized. The alarm means 23 may consist of a small, audible alarm means such as, for example, an Archer model 273-070 12 volt electric siren sold by Tandy Corporation, Fort Worth, Tex. 76102. However, as will now be apparent to those skilled in the art, various other specific alarm means may be used. Thus, the alarm means 23 may include lights, transmitters to activate remote pagers or alarms, automatic phone dialers, etc., as will now be apparent to those skilled in the art. Further, the alarm means 23 may include a plurality of different specific alarms electrically coupled parallel to one another so that more than one specific type of alarm will be activated when the alarm means 23 is electrically energized.

The alarm system 11 includes an electric circuit for selectively electrically coupling the alarm means 23 to the electrical energy source 21. As seen in FIG. 3, the electric circuit preferably includes a normally closed monitor loop network 26.

The alarm system 11 includes a switch means 27 for movement from a first position to a second position upon the occurrence of a monitored event such as if an unauthorized person tampers with the boat B. The switch means 27 is preferably normally closed and may consist of any typical normally closed sensor such as a passive infrared sensor, glass break sensor, smoke alarm, heat sensor, pressure mat, panic button, window foil, photo beam, ultrasonic sensor, microwave sensor, etc., as will now be apparent to those skilled in the art. The switch means 27 is preferably coupled to the first and second components 13, 15 for movement between a first or closed position when the first and second components 13, 15 are adjacent to one another and a second or opened position when the first component 13 is moved away from the second component 15. Thus, the switch means 27 preferably includes a normally open reed switch 29 mounted in the normally closed monitor loop network 26 and attached to the second component 15, and preferably includes a magnet 31 attached to the first component 13 and positioned so as to hold the reed switch 29 closed when the first and second components 13, 15 are adjacent to one another. The reed switch 29 may be a Radio Shack, catalog number 275-1610, reed switch as sold by Tandy Corporation, Fort Worth, Tex. 76102. The reed switch 29 may be attached to the second component 15 by adhesive or the like. Likewise, the magnet 31 may be attached to the first component 13 by adhesive or the like.

The alarm system 11 may include another switch means 33 for movement from a first position to a second position upon the occurrence of a monitored event such as if an unauthorized person tampers with the boat B. The switch means 33 is preferably normally closed and is preferably coupled to the third and fourth components 17, 19 for movement between a first or closed position when the third and fourth components 17, 19 are adjacent to one another and a second or opened position when the third component 17 is moved away from the fourth component 19. Thus, the switch means 33 preferably includes a normally open reed switch 35 mounted in the normally closed monitor loop network 26 in series with the reed switch 29 and attached to the fourth component 19, and preferably includes a magnet 37 attached to the third component 17 and positioned so as to hold the reed switch 35 closed when the third and fourth components 17, 19 are adjacent to one another. The reed switch 35 may be a Radio Shack, catalog number 275-1610, reed switch as sold by Tandy Corporation, Fort Worth, Tex. 76102. The reed switch 35 may be attached to the fourth component 19 by adhesive or the like. Likewise, the magnet 37 may be attached to the third component 17 by adhesive or the like.

Additionally, it will now be apparent to those skilled in the art that the alarm system 11 may include a plurality of additional switch means (not shown) connected in series with the switch means 27, 33 in the normally closed monitor loop network 26 for being coupled to additional coacting components (not shown).

The alarm system 11 includes a timing means 39 electrically coupled by the electric circuit to the electrical energy source 21, the alarm means 23, and the switch means 27, 37, etc., for electrically energizing the alarm means 23 when at least one switch means 27, 37, etc., is moved to the second position, for continuing to electrically energize the alarm means 23 for a set period of time even if the at least one switch means 27, 33, etc., is subsequently moved from the second position back to the first position during the set period of time, for deactivating the alarm means 23 a certain period of time after it is activated, and for reactivating the alarm means 23 a certain period of time after it is deactivated if the at least one switch means 27, 33, etc., remains in the second position. The timing means 39 preferably includes an RC 555 integrated circuit 41, a first transistor 43, a second transistor 47, a diode 49, a first capacitor 51, a second capacitor 53, a first resistor 55, a second resistor 57, a third resistor 59, and a forth resistor 61 electrically coupled to one another, to the electrical energy source 21, to the alarm means 23, and to the switch means 27, 33 as shown schematically in FIG. 3. The integrated circuit 41, first transistor 43, second transistor 47, diode 49, first capacitor 51, second capacitor 53, first resistor 55, second resistor 57, third resistor 59 and fourth resistor 61 are preferably mounted on a rigid circuit board 63 (see FIG. 2). The circuit board 63 and electrical components mounted thereon are preferably dipped in a sealant for moisture protection.

The alarm system 11 preferably includes a master control switch 65 for selectively activating and deactivating the alarm system 11. The master control switch 65 is preferably a typical key-type security switch of any typical construction and operation, which will now be apparent to those skilled in the art, electrically interposed between the electrical energy source 21 and the timing means 39 and requiring a key 67 as shown in FIG. 1 to activate or deactivate the alarm system 11, as will now be apparent to those skilled in the art. However, the master control switch 65 may include a radio frequency switch means for allowing the alarm system 11 to be activated and deactivated from a remote location as will now be apparent to those skilled in the art.

The alarm system 11 preferably includes a weathertight container 69 for containing the alarm means 23, the timing means 39, and the master control switch 65. The container 69 may consist of a two-piece plastic box or the like having a hollow interior within which the circuit board 63 and portions of the alarm means 23 and master control switch 65 are located. The only portions of the alarm means 23 and master control switch 65 thus left exposed are the portions thereof that are designed to be exposed to the elements, as will now be apparent to those skilled in the art. The container 69 will thus protect the timing means 39, alarm means 23 and master control switch 65 from adverse weather conditions and the like even when exposed to the weather.

As shown in FIG. 3, the alarm system 11 may include a motion detector network 73 for activating the alarm means 23 in response to vibration caused by, for example, someone stepping into the boat B, tampering with the motor of the boat B, or tampering with the trailer of the boat B, etc. The motion detector network 73 preferably includes a normally opened motion detector switch 75. The motion detector switch 75 is preferably adjustable to allow the user to adjust the amount of sensitivity required to close the motion detector switch 75 in different situations, etc. The motion detector switch 75 preferably consists of an off-the-shelf switch such as the Seco-Larm SS-057 motion/impact detector manufactured by Seco-Larm USA, Inc. of 17811 Skypark Circle, Irvine, Ca. 90714. The motion detector switch 75 is preferably coupled to the electrical energy source 21 through the master control switch 65. The motion detector network 73 preferably includes a normally closed relay 77 having a coil 79 coupled to the motion detector switch 75 for being energized when the motion detector switch 75 is closed in response to vibration, etc., and having a normally closed contact 81 for being opened by the coil 79 when the coil 79 is energized. The normally closed contact 81 may be mounted in the normally closed monitor loop network 26 and electrically coupled to the electric circuit in series with the reed switches 29, 35, etc., as will now be apparent to those skilled in the art. The physical location of the motion detector switch 75 may vary depending on the unit being protected and may be located remote from the container 69. Thus, for example, when the unit being protected is a motorhome, travel trailer, etc., or boat B mounted on a trailer or the like, it might be desired to mount the motion detector switch 75 a spaced distance from any axle or the like that might serve to dampen any vibration, etc., as will now be apparent to those skilled in the art.

As shown in FIG. 3, the electric circuit may be designed to allow both the basic normally closed monitor loop network 26 and the motion detector network 73 to be activated or to allow only the basic normally closed monitor loop network 26 to be activated while leaving the motion detector network 73 deactivated. Thus, the master control switch 65 may be a single pole, triple throw switch having a first terminal 83 coupled to the basic normally closed monitor loop network 26, an opened second terminal 85, and a third terminal 87 coupled to the motion detector network 73. A diode 89 is electrically coupled between the first and third terminals 83, 87 for allowing electrical energy to pass from the third terminal 87 to the first terminal 83 while preventing electrical energy from passing from the first terminal 83 to the third terminal 87 as will now be apparent to those skilled in the art.

The operation of the electrical components of the alarm system 11 will be apparent to those skilled in the art in view of FIG. 3. Basically, when the master control switch 65 is closed and one or more of the switch means 27, 33, 77, etc., is opened, the integrated circuit 41 will be activated by the transistors 43, 47. The second capacitor 53 will then receive voltage through the first and fourth resistors 55, 61 and the alarm means 23 will be activated (i.e., electrical energy will pass from the electrical energy source 21 to the alarm means 23). The integrated circuit 41 compares the voltage in the second capacitor 53 to the voltage of the first capacitor 51, and shuts down when the voltage in the second capacitor 53 equals the voltage in the capacitor 51 and then deactivates the alarm means 23. If the master control switch 65 remains closed and one of the switch means 27, 33, 77, etc., remains open, the alarm means 23 will be reactivated when the second capacitor 53 discharges. The value of the first and fourth resistors 55, 61 determine the amount of time it takes to charge the second capacitor 53. The diode 49 protects the electric circuit from reverse polarity. If the master control switch 65 is closed to the third terminal 87, the alarm means 23 will be activated any time the normally opened motion detector switch 75 is closed or any time any one of the normally closed switch means 27, 33, etc., is opened, as will now be apparent to those skilled in the art. However, if the master control switch 65 is closed to the first terminal 83, the alarm means 23 will not be activated by the closing of the normally opened motion detector switch 75 as will now be apparent to those skilled in the art. In addition, the alarm system 11 preferably includes means for activating the alarm means 23 any time the master control switch 65 is closed and a voltage surge is detected such as, for example, if someone tries to crank the motor to the boat B with the master control switch 65 closed. More specifically, with the electric circuit designed as shown in FIG. 3, anything that draws a preset amount of voltage from the electric circuit will turn on the first transistor 43 and, thereby, activate the alarm means 23 as will now be apparent to those skilled in the art.

Figure 4:
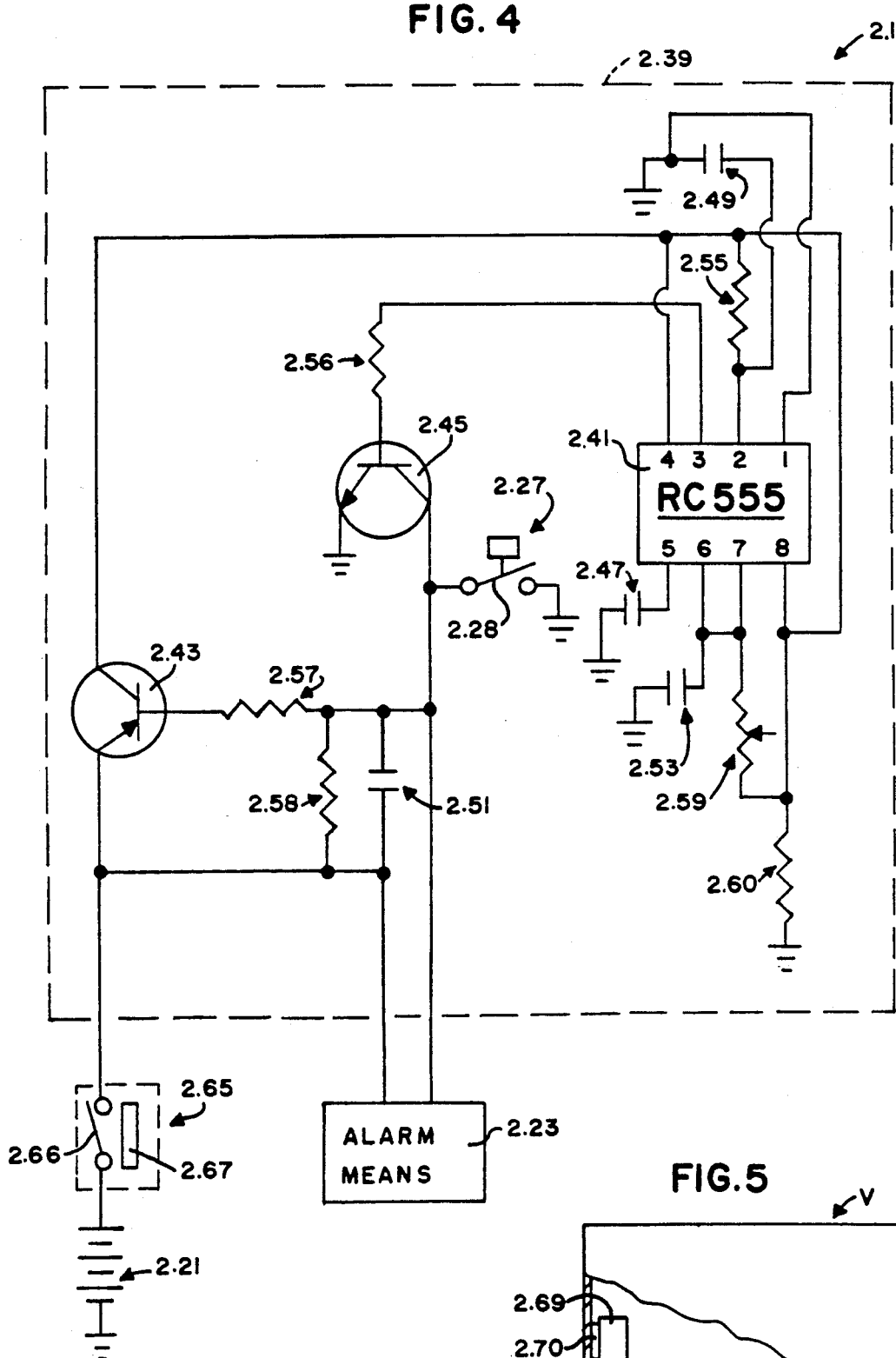
FIG. 4 is a schematic of the electrical components of a second embodiment of the alarm system of the present invention.
Figure 5:
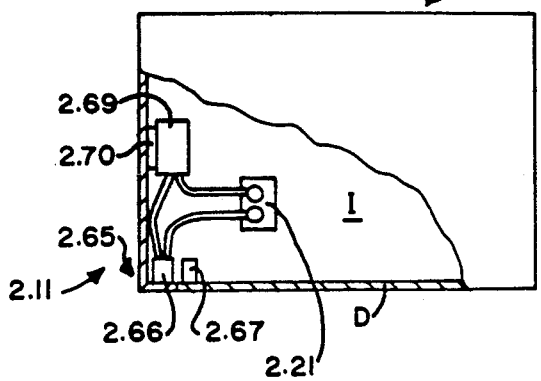
FIG. 5 is a sectional view of a portion of a vending machine with the alarm system of FIG. 4 combined therewith.

A second preferred embodiment of the alarm system of the present invention is shown in FIGS. 4 and 5, and is identified by the numeral 2.11. The alarm system 2.11 is shown in FIG. 5 in combination with a vending machine V or the like for producing an alarm signal upon the occurrence of a monitored event. Thus, the alarm system 2.11 may produce an alarm signal if an unauthorized persons tampers with the vending machine V, etc. The vending machine V may be of any typical construction having an interior I and a door D which may be opened via a lock or the like by authorized persons to allow access to the interior I.

More specifically, the alarm system 211 will produce an audible alarm signal if the vending machine V is moved or otherwise subjected to shock by, for example, someone attempting to break into the vending machine V.

The alarm system 2.11 includes an electrical energy source 2.21. The electrical energy source 2.21 preferably consists of a typical 12-volt wet cell battery or the like.

The alarm system 2.11 includes an alarm means 2.23 for producing an alarm signal when electrically energized. The alarm means 2.23 may consist of a small, audible alarm means such as, for example, an Archer model 273-070 12 volt electric siren sold by Tandy Corporation, Fort Worth, Tex. 76102. However, as will now be apparent to those skilled in the art, various other specific alarm means may be used. Thus, the alarm means 2.23 may include lights, transmitters to activate remote pagers or alarms, automatic phone dialers, etc., as will now be apparent to those skilled in the art. Further, the alarm means 2.23 may include a plurality of different specific alarms electrically coupled parallel to one another so that more than one specific type of alarm will be activated when the alarm means 2.23 is electrically energized.

The alarm means 2.11 includes a switch means 2.27 for movement from a first position to a second position upon the occurrence of the monitored event such as if an unauthorized person tampers with the vending machine. The switch means 2.27 preferably consists of a normally opened motion detector switch 2.28. The motion detector switch 2.28 is preferably adjustable to allow the user to adjust the amount of sensitivity required to close the motion detector switch 2.28 in different situations, etc. The motion detector switch 2.28 preferably consists of an off-the-shelf switch such as the Seco-Larm SS-057 motion/impact detector manufactured by SeccoLarm USA, Inc. of 17811 Skypark Circle, Irvine, Ca. 90714. The motion detector switch 2.28 is electrically coupled to the electrical energy source 2.21 and the alarm means 2.23 in such a manner that the electrical energy source 2.21 will electrically energize the alarm means 2.23 when the switch means 2.27 is moved from a first position (i.e., an opened position) to a second position (i.e., a closed position).

The alarm system 2.11 includes an electric circuit for selectively electrically coupling the alarm means 2.23 and the motion detector switch 2.28 to the electrical energy source 2.21 to electrically energize the alarm means 2.23.

The alarm system 2.11 includes a timing means 2.39 electrically coupled by the electric circuit to the electrical energy source 2.21, the alarm means 2.23, and the switch means 2.27 for electrically energizing the alarm means 2.23 when the switch means 2.27 is moved to a closed position, for continuing to electrically energize the alarm means 2.23 for a set period of time even if the switch means 2.27 is subsequently moved back to the opened position during the set period of time, for deactivating the alarm means 2.23 a certain period of time after it is activated, and for reactivating the alarm means 2.23 a certain period of time after it is deactivated if the switch means 2.27 remains in the closed position. The timing means 2.39 preferably includes an RC 555 integrated circuit 2.41, a first transistor 2.43, a second transistor 2.45, a first capacitor 2.47, a second capacitor 2.49, a third capacitor 2.51, a fourth capacitor 2.53, a first resistor 2.55, a second resistor 2.56, a third resistor 2.57, a fourth resistor 2.58, a fifth resistor 2.59, and a sixth resistor 2.60 electrically coupled to one another, to the electrical energy source 2.21, to the alarm means 2.23, and to the switch means 2.27 as shown schematically in FIG. 4. The first transistor 2.43 preferably consists of a typical 2N3906 transistor. The second transistor 2.45 preferably consists of a typical 2N2222 transistor. The first capacitor 2.47 preferably consists of a typical ceramic capacitor having a value of 0.01 MFD at 25 VDC. The second capacitor 2.49, the third capacitor 2.51, and the fourth capacitor 2.53 preferably each consists of a typical electrolytic capacitor having a value of 100 MFD at 25 VDC. Each resistor preferably consists of a typical metal film or composition resistor with a ¼ watt rating. The first resistor 2.55 and the third resistor 2.57 preferably each has a value of 10,000 ohms. The second resistor 2.56 and the fourth resistor 2.58 preferably each has a value of 1,000 ohms. The fifth resistor 2.59 preferably has a value of 220,000 ohms. However, the value of the fifth resistor 2.59 is preferably variable by means of a typical potentiometer or the like to allow adjustable timing operation. The sixth resistor 2.60 preferably has a value 100 ohms.

The integrated circuit 2.41, the first transistor 2.43, the second transistor 2.45, the first capacitor 2.47, the second capacitor 2.49, the third capacitor 2.51, the fourth capacitor 2.53, the first resistor 2.55, the second resistor 2.56, the third resistor 2.57, the fourth resistor 2.58, the fifth resistor 2.59, and the sixth resistor 2.60 are preferably mounted on a rigid circuit board (not shown) like that disclosed hereinabove with respect to the alarm system 11. The circuit board and electrical components mounted thereon are preferably dipped in a sealant for moisture protection.

The alarm system 211 preferably includes a master control switch 2.65 for selectively activating and deactivating the alarm system 2.11. The master control switch 2.65 preferably includes a normally opened reed switch 2.66 electrically interposed between the electrical energy source 2.21 and the timing means 2.39, and a magnet 2.77 for holding the reed switch 2.66 closed when positioned adjacent the reed switch 2.66 as will now be apparent to those skilled in the art. The reed switch 2.66 is preferably fixedly mounted within the interior I of the vending machine V and the magnet 2.67 is preferably fixedly mounted to the door D of the vending machine V in a position to close the reed switch 2.66 when the door D is closed so that the alarm system 2.11 will be automatically activated whenever the door D of the vending machine V is closed and will be automatically activated whenever the door D of the vending machine V is opened.

The alarm system 2.11 preferably includes a weather-tight container 2.69 for containing the alarm means 2.23, the switch means 2.27, and the timing means 2.39. The container 2.69 may consist of a two-piece plastic box or the like having a hollow interior within which the circuit board and portions of the alarm means 2.23 are located. The container 2.69 will thus protect the timing means 2.39 and alarm means 2.23 from adverse weather conditions and the like even when exposed to the weather. The container 2.69 can be mounted within the interior I of the vending machine V by double sided adhesive 2.70 or the like as will now be apparent to those skilled in the art.

The operation of the electrical components of the alarm system 2.11 will be apparent to those skilled in the art in view of FIG. 4. Basically, when the master control switch 2.65 is closed and the switch means 2.27 is closed by, for example, someone tampering with the vending machine V, the integrated circuit 2.41 will be activated by the transistors 2.43, 2.45. The circuit is operated in a monostable mode with the timing circuit consisting of the fifth resistor 2.59—fourth capacitor 2.53 network, in conjunction with the first transistor 2.43. Operation is initiated by momentarily closing the switch means 2.27, discharging the third capacitor 2.51, and biasing the first transistor 2.43 on through the first resistor 2.55 of its base circuit. Following the time-out period, the fourth resistor 2.58 applies reverse bias to the first transistor 2.43, turning it off. The third capacitor 2.51 provides a positive turn-on latch pulse for the first transistor 2.43, through the third resistor 2.57. The sixth resistor 2.60 provides a pull-down of the circuit current to insure proper turn-off. As will now be apparent to those skilled in the art, the timing means 2.39 will use no electrical power until activated (i.e., until the switch means 2.27 is closed) and will then, after its time cycle, go back to a no-power state, to thereby extend the useful life to the electrical energy source 2.21.

Although the present invention has been described and illustrated with respect to preferred embodiments thereof and preferred uses therefor, it is not to be so limited since modifications and changes can be made therein which are within the full intended scope of the invention.

We claim:

1. An alarm system for producing a sustained alarm in the event of a monitored event; said alarm system comprising:
   a) a battery for providing an electrical energy source;
   b) alarm means for producing an alarm signal when electrically coupled to said electrical energy source;
   c) switch means for movement from a first position to a second position upon the occurrence of said monitored event;
   d) timing means for being activated when said switch means is moved from said first position to said second position and for electrically coupling said alarm means to said electrical energy source; said timing means including means for continuing to electrically couple said alarm means to said source of electrical energy for a set period of time even if said switch means is subsequently moved back to said first position during said set period of time; said timing means including means for deactivating said alarm means a certain period of time after said alarm means is activated and for reactivating said alarm means a certain period of time after said alarm means is deactivated if said switch means remains in said second position; and
   e) a normally closed monitor loop; said switch means including a normally closed switch means mounted in said normally closed monitor loop, said timing means being activated when said normally closed switch means is opened.

2. The alarm system of claim 1 in which is included a plurality of normally closed switch means mounted in series with one another in said normally closed monitor loop, said timing means being activated when any of said normally closed switch means is opened.

3. The alarm system of claim 1 in which is included motion detector network for activating said timing means upon the occurrence of said monitored event.

4. The alarm system of claim 3 in which said motion detector network includes a normally opened motion detector switch for being moved to a closed position by the occurrence of said monitored event.

5. The alarm system of claim 4 in which said motion detector network includes a normally closed relay having a coil coupled to said normally opened motion detector switch and includes a normally closed contact mounted in said normally closed monitor loop, movement of said normally opened motion detector switch to said closed position electrically energizing said coil and causing said normally closed contact to open to activate said timing means.

6. The alarm system of claim 3 in which is included a master control switch having a first closed position for activating said normally closed monitor loop while leaving said motion detector network deactivated, and having a second closed position for activating both said normally closed monitor loop and said motion detector network.

7. An alarm system for producing a sustained alarm in the event of a monitored event; said alarm system comprising:
   a) a battery for providing an electrical energy source;
   b) alarm means for producing an alarm signal when electrically coupled to said electrical energy source;
   c) switch means for movement from a first position to a second position upon the occurrence of said monitored event; said switch means including a normally opened motion detector switch; and
   d) timing means for being activated when said switch means is moved from said first position to said second position and for electrically coupling said alarm means to said electrical energy source; said timing means including means for continuing to electrically couple said alarm means to said source of electrical energy for a set period of time even if said switch means is subsequently moved back to said first position during said set period of time; said timing means including means for deactivating said alarm means a certain period of time after said alarm means is activated and for reactivating said alarm means a certain period of time after said alarm means is deactivated if said switch means remains in said second position.

8. An alarm system for producing a sustained alarm in the event of a monitored event; said alarm system comprising:
   a) a battery for providing an electrical energy source;
   b) alarm means for producing an alarm signal when electrically coupled to said electrical energy source;
   c) switch means for movement from a first position to a second position upon the occurrence of said monitored event; and
   d) timing means for being activated when said switch means is moved from said first position to said second position and for electrically coupling said alarm means to said electrical energy source; said timing means including means for continuing to electrically couple said alarm means to said source of electrical energy for a set period of time even if said switch means is subsequently moved back to said first position during said set period of time; said timing means including means for deactivating said alarm means a certain period of time after said alarm means is activated and for reactivating said alarm means a certain period of time after said alarm means is deactivated if said switch means remains in said second position; said timing means including means for activating said alarm means if a voltage surge is detected.

9. The combination with a non-chassis ground boat of a closed loop alarm system for producing a sustained alarm in the event of a monitored event; said alarm system comprising:
   a) a battery for providing an electrical energy source;
   b) alarm means for producing an alarm signal when electrically coupled to said electrical energy source;
   c) a normally closed monitor loop;
   d) a plurality of normally closed switch means mounted in series in said normally closed monitor loop for movement from a first position to a second position upon the occurrence of said monitored event;
   e) motion detector network for activating said timing means upon the occurrence of said monitored event; said motion detector network including a normally opened motion detector switch for being moved to a closed position by the occurrence of said monitored event; said motion detector network including a normally closed relay having a coil coupled to said normally opened motion detector switch and includes a normally closed contact mounted in said normally closed monitor loop in series with said plurality of normally closed switch means;
   f) timing means for being activated when any of said switch means is moved from said first position to said second position and for electrically coupling said alarm means to said electrical energy source; said timing means including means for continuing to electrically couple said alarm means to said source of electrical energy for a set period of time even if said switch means is subsequently moved back to said first position during said set period of time; said timing means including means for deactivating said alarm means a certain period of time after said alarm means is activated and for reactivating said alarm means a certain period of time after said alarm means is deactivated if said switch means remains in said second position; said timing means being activated when any of said normally closed switch means is opened; movement of said normally opened motion detector switch to said closed position electrically energizing said coil and causing said normally closed contact to open to activate said timing means; said timing means including means for activating said alarm means if a voltage surge is detected; and
   a master control switch having a first closed position for activating said normally closed monitor loop while leaving said motion detector network deactivated, and having a second closed position for activating both said normally closed monitor loop and said motion detector network.

10. The combination with a vending machine of an alarm system for producing a sustained alarm in the event of a monitored event; said alarm system comprising:
   a) a battery for providing an electrical energy source;
   b) alarm means for producing an alarm signal when electrically coupled to said electrical energy source;
   c) a normally opened motion detector switch for movement from an opened position to a closed position upon the occurrence of said monitored event;
   d) timing means for being activated when said normally opened motion detector switch is moved from said opened position to said closed position and for electrically coupling said alarm means to said electrical energy source; said timing means including means for continuing to electrically couple said alarm means to said source of electrical energy for a set period of time even if said switch means is subsequently moved back to said closed position during said set period of time; said timing means including means for deactivating said alarm means a certain period of time after said alarm means is activated and for reactivating said alarm means a certain period of time after said alarm means is deactivated if said switch means remains in said closed position; and e) a master control switch for selectively activating and deactivating said alarm system; said master control switch including a normally opened reed switch electrically interposed between said electrical energy source and said timing means, and a magnet for holding said reed switch closed when positioned adjacent said reed switch; said reed switch being fixedly mounted within said interior of said vending machine; said magnet being fixedly mounted to said door of said vending machine in a position to close said reed switch when said door is closed so that said alarm system will be automatically activated whenever said door of said vending machine is closed and will be automatically deactivated whenever said door of said vending machine is opened; said timing means using no electrical power until activated.

* * * * *